US005405907A

United States Patent [19]

Bowman et al.

[11] Patent Number: 5,405,907

[45] Date of Patent: Apr. 11, 1995

[54] PRINT RETAINING COATINGS AND COATING COMPOSITIONS FOR THE PREPARATION THEREOF

[75] Inventors: Wayne A. Bowman, Walworth; Larry D. Hagemeier, Rochester, both of N.Y.

[73] Assignee: Eastman Kodak Company, Rochester, N.Y.

[21] Appl. No.: 740,238

[22] Filed: Aug. 5, 1991

Related U.S. Application Data

[62] Division of Ser. No. 446,245, Dec. 5, 1989, Pat. No. 5,075,164.

[51] Int. Cl.[6] .......... C08K 3/20; C08K 3/34; C08L 33/02; G03C 1/76

[52] U.S. Cl. .......... 524/446; 524/385; 524/389; 524/547; 524/560; 430/523; 430/529

[58] Field of Search .......... 524/446, 389, 385, 547, 524/560; 430/529, 523

[56] References Cited

U.S. PATENT DOCUMENTS

| | | | |
|---|---|---|---|
| 3,525,621 | 8/1970 | Miller | 430/531 |
| 4,182,699 | 1/1980 | Fan | 524/389 |
| 4,278,583 | 7/1981 | Sekiya | 524/446 |
| 4,351,754 | 9/1982 | Dupré | 524/446 |
| 4,554,307 | 11/1985 | Farrar et al. | 524/446 |
| 4,678,742 | 7/1987 | Tamagawa et al. | 430/523 |
| 4,960,681 | 10/1990 | Aotsuka | 430/634 |
| 5,073,585 | 12/1991 | Neubert | 524/446 |
| 5,104,779 | 4/1992 | Säverin et al. | 430/529 |

FOREIGN PATENT DOCUMENTS

| | | | |
|---|---|---|---|
| 0555657 | 7/1978 | U.S.S.R. | 524/389 |

*Primary Examiner*—Paul R. Michl
*Assistant Examiner*—Olga Asinovsky
*Attorney, Agent, or Firm*—Robert A. Gerlach

[57] ABSTRACT

A photographic paper having a print retaining layer including a granular tooth providing ingredient in a binder polymer having a $T_g$ of 30° to 65° C. which is the addition product of from about 30 to about 98 mol percent of an alkylmethacrylate wherein the alkyl group has from 3 to 8 carbon atoms, from about 2 to about 10 mol percent of an alkali metal salt of a ethylenically unsaturated sulfonic or carboxylic acid, from 0 to about 65 mol percent of a vinyl benzene monomer and from 0 to about 5 mol percent of a crosslinking agent containing two ethylenically unsaturated bonds.

5 Claims, No Drawings

PRINT RETAINING COATINGS AND COATING COMPOSITIONS FOR THE PREPARATION THEREOF

This is a divisional of application Ser. No. 446,245, filed Dec. 5, 1989, now U.S. Pat. No. 5,075,164.

BACKGROUND OF THE INVENTION

1. Field of the Invention

This invention relates to print retaining coatings and to coating compositions suitable for the preparation thereof. More particularly, this invention relates to polyolefin coated photographic paper supports having on one side thereof a coating of a polymer capable of receiving and retaining all types of marking including, printing, pencil and the like. Moreover, the invention relates to such print retaining coatings that also possess antistatic properties.

2. Description of Related Art

U.S. Pat. No. 4,678,742 relates to a photographic paper capable of being printed on one side thereof wherein a layer providing a writing property includes an inorganic pigment having a designated oil absorption degree and an acrylate emulsion of a copolymer of an acrylate ester and either styrene or methylmethacrylate.

U.S. Pat. No. 4,610,924 is similar in nature to the above-mentioned U.S. patent and employs a crystalline silica filled gelatin, SBR, MBR or a polyurethane film forming polymer.

U.S. Pat. No. 3,525,621 relates to a photographic element having an antistat layer on one side of the support, which also permits marking that will be retained through the processing step.

U.S. Pat. No. 4,582,783 relates to a photographic material having an antistat layer applied to the back thereof which has good quality as a writing and printing surface.

U.S. Pat. No. 4,197,127 discloses certain latex copolymers that impart added stability to photographic emulsions and improved photographic speed and contrast.

U.S. Pat. No. 4,542,095 discloses antistatic compositions for use in photographic elements wherein aqueous latex compositions are used as binder materials in conjunction with polymerized alkylene oxide monomers and alkali metal salts as the antistatic agents.

While these various references relate to some of the aspects of this invention, they are deficient with regard to a number of problems that confronted the inventors hereof not only with respect to the writing quality of the coating layers but also with respect to the stability of these write or print retaining layers when processed through the developing solutions. Also, in the preparation of the elements wherein various deficiencies, such as blocking, incompatibility of ingredients and the like may occur.

SUMMARY OF THE INVENTION

This invention provides coatings having a print retaining capability comprising a granular tooth providing ingredient and a binder polymer comprising an addition product of from about 30 to 98 mol percent of an alkyl methacrylate wherein the alkyl group has from 3 to 8 carbon atoms, from about 2 to about 10 mol percent of an alkali metal salt of an ethylenically unsaturated sulfonic or carboxylic acid, from 0 to about 65 mol percent of a vinyl benzene and from 0 to about 5 mol percent of a crosslinking agent containing two ethylenically unsaturated bonds, the polymer having a glass transition point of from 30° to 65° C. Preferably, the coatings contain an antistatic agent.

The invention also contemplates aqueous coating compositions for providing a print retaining layer to a surface, the compositions including from about 3 to about 7 weight percent of the binder polymer indicated above, from about 0.2 to about 0.5 weight percent of an organo clay thickening agent, from about 2 to about 6 weight percent of a granular tooth providing ingredient, from about 5 to about 10 weight percent of a defoaming agent and the balance water.

DESCRIPTION OF THE PREFERRED EMBODIMENTS

While the invention herein finds particular use in the photofinishing industry to print bar codes or other indicia on the back of paper prints by using dot matrix printers for example, the invention described herein is useful and suitable for applying print, ink or pencil markings to any surface wherein the original surface does not possess the desired characteristics. The application with regard to photofinishing however is a particularly stringent requirement because the coding and the indicia impressed thereon by one of the above-described methods must survive photographic processing in order to be useful. In photofinishing applications, the coating compositions, including the binder therefore must possess the following requirements:

1. The ingredients must be compatible. This is a particularly stringent requirement when antistatic agents are employed in the coating composition in order that the write retaining layer also possess antistatic properties. The binder polymer in the coating composition in the form of a latex can be easily destabilized causing agglomeration of the latex particles to occur.

2. The coatings must be resistant to pick off during conveyance through roller/nip transport machines in the preparation of the photographic paper articles.

3. The coatings must be block resistant in the rolled form. That is, in preparation of printing paper for use in photographic applications, the paper in processing is rolled upon itself. It is necessary that the write retaining layer does not block together with the opposite surface of the paper support.

4. The coatings must be alkali resistance to a pH of 10 in order to survive the photographic processing solutions.

5. The coatings must be resistant to discoloration either due to the processing solutions or to aging.

6. The coatings must be able to both receive and retain ink or other marking materials through the photographic processing.

7. The coatings must not be photoactive and interfere with the light sensitive portions of the photographic paper.

8. The coatings must have a stability of from 6 to 12 months in order to be commercially acceptable.

The coatings and the coating compositions in accordance with this invention satisfy these requirements by utilizing a particulate latex binder, the binder being the addition product of from about 30 to 98 mol percent of an alkyl methacrylate wherein the alkyl group has from 3 to 8 carbon atoms, from about 2 to about 10 mol percent of an alkali metal salt of an ethylenically unsaturated sulfonic or carboxylic acid, from 0 to 65 mol percent of a vinyl benzene monomer and from 0 to about 5 mol percent of a crosslinking agent containing two ethylenically unsaturated bonds where the polymer has a glass transition. temperature of from about 30° to about 65° C., preferably from about 40° C. to about 60° C. Optionally, the latex may also include up to 50 mol percent of an alkylmethacrylate having less than three carbon atoms in the alkyl group, so long as the $T_g$ is within the range set forth above.

In the preparation of the latex hinder polymer, any suitable alkyl methacrylate having from 3 to 8 carbon atoms in the alkyl group may be used such as, for example, n-propyl methacrylate, isopropyl methacrylate, n-butyl methacrylate, isobutyl methacrylate, tertiary butyl methacrylate, n-pentyl methacrylate, 2-methyl butyl methacrylate, 2-dimethyl propyl methacrylate, hexyl methacrylate, 2-methyl pentyl methacrylate, 2-4-dimethyl butyl methacrylate, heptyl methacrylate, 2-methyl hexyl methacrylate, octyl methacrylate, 4-methyl heptyl methacrylate and the like. It is preferred to use butyl methacrylate, most preferably n-butylmethacrylate as this ingredient has a strong influence on the $T_g$ of the latex polymer and thereby the blocking characteristics of the binder polymer and the coating characteristics of the coating composition. The alkylmethacrylate preferably is used in an amount of from about 40 to about 95 mol percent.

Any suitable alkali metal salt of an ethylenically unsaturated sulfonic acid or carhoxycylic acid may be employed in the preparation of the latex polymers in accordance with this invention such as for example, the sodium, potassium and lithium salts of sulfoethyl methacrylate, the sodium, potassium and lithium salts of sulfoethyl acrylate, the sodium, potassium and lithium salts of acrylic acid and methacrylic acid, the sodium, potassium and lithium salts of styrene sulfonic acid, sodium 2-acrylamido-2-methyl-propanesulfonic acid, the potassium salt of 3-acrylamido-3-methylbutenoic acid, the lithium salt of para-vinylbenzoic acid, and the like. This ingredient is utilized in an amount of from about 2 to about 10 mol percent and preferably from about 4 to about 7 mol percent in order to render the latex polymer compatible with the other coating ingredients, particularly the defoaming agent which, if not compatible, will cause the destabilization and agglomeration of the latex thus rendering the polymer incapable of being coated. Sodium 2-acrylamido-2-methylpropanesulfonic acid is the preferred material.

A vinylbenzene monomer may be employed in the preparation of the latex polymer in accordance with this invention in an amount of 0 to about 65 mol percent preferably in an amount of from about 40 to about 60 mol percent and most preferably about 50 mol percent. Styrene or substituted styrene monomers may be employed including vinyl toluene p-ethyl styrene, p-tertiary butyl styrene, and the like. Further, the alkylene portion may also be substituted by an alkyl group such as a methyl group, an ethyl group and the like such as, alpha methyl styrene. While styrene itself is preferred, other vinyl benzene monomers may be employed in like amounts.

Any suitable crosslinking agent containing two ethylenically unsaturated bonds may be employed in an amount from 0 to about 5 mol percent, preferably in an amount of from 1.5 to about 3 mol percent. Any compound containing 2 ethylenically unsaturated groups may be employed herein, such as for example, divinyl benzene, N,N'-methylene bisacrylamide, ethylene glycol dimethacrylate, 2,2-dimethyl-1,3-propylene glycol diacrylate, 1,3-butylene glycol diacrylate, 1,4-cyclohexylene dimethylene glycol dimethacrylate, ethylene glycol diacrylate, propylene glycol diacrylate, propylene glycol dimethacrylate, 1,6-hexylmethylene glycol dimethacrylate, and the like. Ethylene glycol dimethacrylate is the preferred crosslinking agent. The presence of the crosslinking agents even in the small amounts set forth has an affect on raising the glass transition temperature and also increases the coverage that the coating composition may be coated onto the support without the occurrence of blocking.

The print retaining layer, in addition to the binder polymer also contains a granular ingredient in an amount sufficient to provide tooth to the layer. By "tooth" is meant that the layer is rendered capable of receiving a printed message utilizing ink, pencil or other marking material. Granular tooth providing ingredients are well known in the art for such purposes and include inorganic pigments having a particle diameter range of from about 0.1 to about 7 microns with an average particle size of from about 0.5 to about 2.5 microns. Any suitable granular material including crystalline silica, alumina-silica, amorphous silica, barium sulfate, aluminum hydroxide, talc, kaolin, calcined clay, diatomaceous earth, zeolites and the like may be used. The preferred material is calcined clay sold by Engelhard Industries under the trade designation Satintone Special.

The binder polymers in accordance with this invention are prepared by emulsion polymerization techniques to obtain a latex polymer of approximately 30 percent by weight solids in water. Coating compositions in accordance with this invention are prepared by adding a thickener, a defoaming agent, antistatic agent, if employed and tooth providing agent in the proper proportions to the latex/water emulsion and then adjusting the water content-to the proper concentration. The thickener is to provide the proper viscosity in order that the coating composition can be gravure coated, that is a viscosity of from about 7 to about 120 centipoise. It is necessary that the thickener is compatible with the remaining ingredients of the coating composition especially with the defoamer so the latex does not destabilize. Further, the thickener must be compatible with the write retaining granular ingredient in order that it not inhibit the write retaining character of the coated layer. While any suitable thickener may be employed, organo clay, particularly those sold under the trademark BENTONE by NL Industries of Highstown, N.J. are preferred.

A defoaming agent is necessarily included in the coating composition and this defoaming agent must be compatible with the latex binder polymer in order that the latex does not destabilize or agglomerate. While any suitable defoaming agent may be employed, monohydric alcohols are preferred. Those having a carbon atom content of from 3 to 5 are more preferred while isobutanol is the most preferred defoaming agent.

The antistatic agent, if one is to be employed, is included in the preparation of the coating composition. Any suitable antistatic agent may be employed, however, the non-ionic surface-active polymers in conjunction with the alkali metal salts described in U.S. Pat. No. 4,542,095, which is totally incorporated herein by reference are preferred. The combination of a polyethylene ether glycol with lithium nitrate is the most preferred antistatic agent. During the course of the addition of the various ingredients, the emulsion is maintained under constant agitation and subsequently thereto the agitation is continued for a period of about 30 minutes.

When a photographic paper containing a polyolefin layer on either side thereof is to be treated in accordance with this invention with a composition to impart writeability to the surface, it is preferred that the polyolefin layer first be corona discharge treated. The coating composition is coated at a coverage of between about 0.15 grams per square meter to about 1.5 grams per square meter. The composition is applied by direct or offset gravure and dried at temperatures between 90° and 170° F. Both color and black and white photosensitive papers may be coated in accordance with this invention. While different photosensitive elements may require different coverages, for example, black and white coverages are generally on the order of from about 1 to about 1½ grams per square meter while color coverages are generally on the order of 0.17 to about 0.8 grams per meter squared, different coverage values may be applied depending upon the particular application to which the write retaining layer applied is to be used.

The invention will be further illustrated by the following examples:

EXAMPLE 1

A latex copolymer having the composition 50 mol percent styrene -45 mol percent butyl methacrylate 5 mol percent sodium 2-acrylamide-2-methylpropane sulfonic acid is prepared as follows: to a 3 liter addition flask was added 1 liter of degased distilled water, 60 ml of a 30% solution of sodium laurel sulfate in water sold by Alcolac Chemical Corp. of Baltimore, Md. under the name Sipex SB, 520 g of styrene, 656 g of butyl methacrylate, and 198 g of 50% sodium . 2-acrylamido-2-methylpropane sulfonic acid. The mixture was stirred under nitrogen. To a 5 liter reaction flask was added 2 liter of degased distilled water and 60 ml of 30% Sipex SB. The flask was placed in an 80° C. bath. 13.6 g of potassium persulfate and 4.48 g of sodium meta bisulfite were added, immediately followed by the contents of the addition flask over a period of 40 minutes. The flask was stirred at 80° under nitrogen for two hours and then cooled. The latex was filtered to remove a small amount of coagulum and contained 29% solids. The latex polymer has a $T_g$ of 50° C.

EXAMPLE 2

A latex copolymer having the composition of 50 mol percent styrene - 43 mol percent butyl methacrylate 5 mol percent 2-acrylamido-2-methylpropane sulfonic acid-2 mol percent ethylene glycol dimethacrylate is prepared as follows: to 3 liter addition flask was added 1 liter of degased distilled water, 60 ml of 30% Sipex SB, 528 g of styrene, 620 g of butyl methacrylate, 228 g of 58% 2-acrylamido-2-methyl propanesulfonic acid sodium salt, and 40 g of ethylene glycol dimethacrylate. The mixture was stirred under nitrogen. To a 5 liter receiver flask was added 2 liters of degased distilled water, and 60 ml of 30% Sipex SB. The flask was placed in an 80° C. bath and 12.55 g of potassium persulfate and 4.15 g of sodium meta bisulfite were added, followed immediately by the contents of the addition flask over a period of 40 minutes. The flask was stirred under nitrogen at 80° for two hours to give a bluish, translucent latex. The flask was cooled and the latex was filtered to remove coagulum. The latex contained 28.9% solids. The latex polymer has a $T_g$ of 60° C.

Examples 1 and 2 set forth the method of preparation of the specific latex polymers having the stated mold percentages of the various monomers employed therein.

In a like fashion, latex polymers set forth in Table I were prepared from monomers utilized in amounts to obtain the stated mol percentages.

TABLE I

| Example No. | Tg °C. | Composition |
|---|---|---|
| 3 | 43 | butylmethacrylate-co-sodium 2-acrylamido-2-methylpropane sulfonic acid-co-ethylene glycol dimethacrylate (93/5/2) |
| 4 | 40 | butylmethacrylate-co-sodium 2-acrylamido-2-methylpropane sulfonic acid-co-ethylene glycol dimethacrylate (85/5/10) |
| 5 | 31 | butylmethacrylate-co-sodium 2-acrylamido-2-methylpropane sulfonic acid (95/5) |
| 6 | 38 | butylmethacrylate-co-sodium acrylate-co-ethylene glycol dimethacrylate (93/5/2) |
| 7 | 43 | butylmethylacrylate-co-sodium acrylate (95/5) |
| 8 | 64 | butylmethacrylate-co-ethylmethacrylate-co-sodium 2-acrylamido-2-methylpropane sulfonic acid-co-ethylene-glycol dimethacrylate (46/46/5/2) |
| 9 | 63 | styrene-co-butylmethacrylate-co-sodium-2-acrylamido-2-methyl-propane sulfonic acid (65/30/5) |
| 10 | 100 | (comparison) styrene-co-sodium 2-acrylamido-2-methylpropane sulfonic acid (95/5) |
| 11 | 20 | (comparison) methylacrylate-co-sodium 2-acrylamido-2-methylpropane sulfonic acid-co-sodium 2-acetoacetoxyethyl-methacrylate (90/5/5 weight percent) |
| 12 | 40–50 | (comparison) acrylonitride-co-vinylidene chloride-co-sodium acrylate (17/75/8 weight percent) |
| 13 | 40–50 | (comparison) acrylonitride-co-vinylidene chloride-co-sodium acrylate (14/80/6 weight percent) |
| 14 | 68 | (comparison) ethylmethacrylate-co-sodium 2-acrylamido-2-methylpropane sulfonic acid (95/5) |

Coating compositions were prepared having the following formulations wherein, each of the 14 latex copolymers above were employed in the same percent by weight:

| Ingredient | Weight Percent |
|---|---|
| Organo-clay[1]-thickner | 0.30 |
| Polyethylene ether glycol[2]-antistat molecular weight 3350 | 0.45 |
| Lithium nitrate-antistat | 0.30 |
| Latex - binder | 4.95 |
| Calcine Clay[3] - granular tooth providing ingredient | 3.99 |
| Sodium salt of polymeric carboxylic acid[4]-dispersant | 0.01 |
| Isobutanol defoaming agent | 7 |

-continued

| Ingredient | Weight Percent |
|---|---|
| Water medium | 83 |

[1]Bentone LT, NL Industries
[2]Carbowax 3350, Union Carbide Corp.
[3]Satintone, Engelhard Industries
[4]Dispex N-40, Allied Colloid Inc.

Each of the coating compositions utilizing the latex copolymers of Examples 1–6 were gravure coated onto the back side, the side opposite the light sensitive layer, of a corona discharge treated photographic paper having a polyethylene layer on both sides thereof in a coverage of 0.5 grams/meter$^2$. The compositions were dried between 90° and 110° F.

Each of the resulting 14 paper samples were subjected to the two following tests:

Carver Press Test—Two sheets of the coated paper were placed in a Carver Press back to back at 114° F. and 14,000 psi for two minutes the sheets were removed from the press and evaluated for sticking on a scale of "0" to "5" where "0" rating indicates the sheets fall apart and a "5" rating indicates the sheets are blocked together.

Ink Retention Test—a series of lines approximately ⅛ inch in length and equal density are printed utilizing an ink ribbon printer unto the coated papers prepared as above. The paper was then passed through a conventional processor and evaluated for print retention. A rating of "1" indicates no difference between the preprocessed and postprocessed print while a rating of "5" indicates that no ink survives the processing.

The results of these tests for the 16 different coated papers is set forth in Table II.

TABLE II

| Example No. | Carver Press | Ink Retention |
|---|---|---|
| 1 | 0 | 1 |
| 2 | 0 | 1 |
| 3 | 0 | 1 |
| 4 | 1 | 1 |
| 5 | 1 | 1 |
| 6 | 1 | 1 |
| 7 | 2 | 1 |
| 8 | 0 | 2 |
| 9 | 0 | 2 |
| 10 | 0 | 5 |
| 11 | 2 | 5 |
| 12 | 0 | 3 |
| 13 | 0 | 5 |
| 14 | 0 | 5 |

It should be understood that other suitable latex polymers, thickening agents, defoaming agents, antistatic agents, tooth providing ingredients may be employed throughout the examples in like amounts to obtain similar results.

What is claimed is:

1. An aqueous coating composition for providing a print retaining layer to a paper surface which comprises from about 3 to 7 weight percent of a latex binder polymer comprising the addition product of from about 30 to about 98 mol percent of an alkylmethacrylate wherein the alkyl group has from 3 to 8 carbon atoms, from about 2 to about 10 mol percent of an alkali metal salt of a ethylenically unsaturated sulfonic or carboxylic acid, from 0 to about 65 mol percent of a vinyl benzene monomer and from 0 to about 5 mol percent of a cross-linking agent containing two ethylenically unsaturated bonds, said binder polymer having a $T_g$ of from 30° C. to 65° C., from about 0.2 to about 0.5 weight percent of an organo clay thickening agent, from about 2 to about 6 weight percent of a granular tooth providing ingredient, from about 5 to about 10 weight percent of a defoaming agent and the balance water.

2. The aqueous coating composition of claim 1 wherein an antistatic agent is included.

3. The coating composition of claim 2 wherein the antistatic agent is from about 0.2 to about 0.7 weight percent of a polyethylene ether glycol and from about 0.2 to about 0.5 weight percent of an alkali metal salt.

4. The aqueous coating composition of claim 1 wherein the defoaming agent is an alkanol having 3 to 8 carbon atoms.

5. The aqueous coating composition of claim 4 wherein the defoaming agent is isobutanol.

* * * * *